(12) United States Patent
Beyda et al.

(10) Patent No.: US 6,504,866 B1
(45) Date of Patent: Jan. 7, 2003

(54) SYSTEM AND METHOD FOR ELIMINATING COMPANDING CONVERSION DISTORTION ON INTERNATIONAL MODEM CALLS

(75) Inventors: William J. Beyda, Cupertino, CA (US); Shmuel Shaffer, Palo Alto, CA (US)

(73) Assignee: Siemens Information & Communication Networks, Inc, Boca Raton, FL (US)

( * ) Notice: Subject to any disclaimer, the term of this patent is extended or adjusted under 35 U.S.C. 154(b) by 0 days.

(21) Appl. No.: 09/311,836

(22) Filed: May 14, 1999

(51) Int. Cl.$^7$ .............................. H04B 1/38; H04L 5/16
(52) U.S. Cl. ...................... 375/222; 375/219; 375/249
(58) Field of Search ............................... 375/216, 219, 375/220, 222, 223, 257, 249; 379/93.08, 93.14, 93.15

(56) References Cited

U.S. PATENT DOCUMENTS

| | | | | |
|---|---|---|---|---|
| 4,661,946 A | * | 4/1987 | Takahashi et al. ........... 370/378 |
| 5,652,782 A | * | 7/1997 | Hughes-Hartogs ........... 379/27 |
| 5,671,251 A | * | 9/1997 | Blackwell et al. ........... 375/222 |
| 5,818,870 A | * | 10/1998 | Yaguchi ...................... 375/219 |
| 6,121,228 A1 | * | 4/2001 | Vlajnic ....................... 375/222 |

* cited by examiner

*Primary Examiner*—Phuong Phu

(57) ABSTRACT

A data communication system and method that reduces conversion distortion on data calls between locations that encode telephone signals according to different conversion standards is disclosed. The data communication system (40) includes a first switch (44) and a processor (50). The first switch (44) receives a telephone call carrying a first analog modulated data signal, and converts the first analog modulated data signal to a first digitized data signal according to a first conversion standard. Next, the processor (50) converts the first digitized data signal back to the first analog modulated data signal and then demodulates the first analog modulated data signal to recover the original data signal. The processor (50) thereafter modulates the original data signal to produce a second analog modulated data signal and converts the second analog modulated data signal to a second digitized data signal according to a second digital conversion standard prior to transmission of the data signal to a receiver of the telephone call.

22 Claims, 5 Drawing Sheets

SYSTEM AND METHOD FOR ELIMINATING COMPANDING CONVERSION DISTORTION ON INTERNATIONAL MODEM CALLS

FIELD OF THE INVENTION

This invention relates to data communication systems, and, more particularly, to data communication systems for international modem calls.

BACKGROUND OF THE INVENTION

With the advent of computers, high speed modems and computer networks, including the Internet, massive quantities and types of data have become readily accessible to computer users and are capable of being transferred between geographically remote computers.

Today, most telephone systems use digital transmission for both voice and modem calls, i.e., the transmission of data over telephone lines. For voice calls, the voice quality of a signal transmitted digitally at the receiving end of the call is superb to the human ear. However, for modem calls, the data received by the computer user at the receiving end of the call is often a distorted version of the originally transmitted data. The problem with modem calls that are transmitted between different countries is that the digital conversion standard used in some countries is different from that used in others. For example, the digital conversion standard used in Europe, known as A-law, converts the analog signal to different digital levels than the digital conversion standard used in the U.S., known as $\mu$-law. The conversion directly between the two formats results in distortion, which while imperceptible in voice calls, wreaks havoc with data transmitted by modems, particularly high speed modems.

FIG. 1 illustrates a prior art data communication system that could be used to transmit international modem calls. Using an example of a data transmission from the United States to Europe, a modem signal is first generated by a local computer modem 10 in the United States. The local modem 10 converts the original computer data signal to an analog modulated data signal. Then, the analog modulated data signal is transmitted over an analog telephone line to a local central office 12. A converter 14, at the local central office 12, converts the analog modulated data signal into a $\mu$-law digitized data signal. In particular, the converter 14 utilizes a $\mu$-law table to convert the analog modulated data signal into a digital representation, comprised of a series of 8 bit digital values.

Next, the local central office 12 transmits the $\mu$-law digitized data signal to a long distance carrier, such as AT&T, over a digital telephone line. The long distance carrier, at a local toll office 16 in the U.S., converts the $\mu$-law digitized data signal to an A-law digitized data signal using a converter 18. Presently, the $\mu$-law to A-law or A-law to $\mu$-law conversion occurs in the toll office of the $\mu$-law country. However, the $\mu$-law digitized data signal could be transmitted over digital transmission lines from the local toll office 16 to a remote toll office 20 where the conversion occurs utilizing a converter 22. To make the direct $\mu$-law to A-law conversion, the converter 18 utilizes a conversion table of all $\mu$-law values and their corresponding A-law values. The converter 18, in essence, converts the 8-bit American digital representations into 8-bit European digital representations.

After converting the $\mu$-law digitized data signal to the A-law digitized data signal, the local toll office 16 sends the A-law digitized data signal over digital transmission lines to a remote toll office 20 in Europe and then to a remote central office 24 where a converter 26 converts the A-law digitized data signal back to the analog modulated data signal. Finally, the recovered analog modulated data signal is transmitted over an analog telephone line to a remote computer where a remote computer modem 28 of the end user demodulates the analog modulated data signal to recover the original computer data.

The conversion distortion is introduced to the prior art data communication described above in two ways. First, because the original conversion from analog modulated data to $\mu$-law digitized data requires a digital value to be selected, the digitally converted signal may not be reproduced perfectly even in native $\mu$-law transmission. Second, when the conversion from $\mu$-law to A-law digitized data occurs, there may not be an A-law value that exactly corresponds to the $\mu$-law value, so another distortion can occur.

This type of distortion can be introduced into every sample, causing fluctuations that mimic, or obscure, the phase shifts that high speed modems often use for modulation. Slower speed modems (9600 bps and below) are less susceptible to the conversion distortion because there is more time to analyze the signal changes, and the distortion does not entirely block out the phase shifts or create artificial phase shifts. As a result, the modem signal delivered in Europe to the user, in the above example, has many additional changes beyond what the original modem created, and some of the original changes are now partially masked. This prevents high speed modulation from occurring effectively. Presently, the world is just about evenly split between A-law and $\mu$-law countries, so the resulting digital conversion problem is not a uniquely American/European problem.

Another option for transmitting data internationally is for end users to subscribe to a global Internet service provider. However, subscribing to a global Internet provider is quite costly for end users. Furthermore, additional software is required to complete a dial-up connection from one personal computer to another for the purpose of file sharing, as the Internet service provider, and other data networks, require transmission of data in a particular protocol. There are also security issues associated with using a public data network like the Internet.

As a result, a need exists for a data communications system that can transmit international modem calls in a manner that eliminates the digital conversion distortion, from A-law to $\mu$-law or $\mu$-law to A-law.

SUMMARY OF THE INVENTION

To eliminate the distortion created by converting a modem signal from one digital format directly to another and to eliminate the modem speed penalty associated with such distortion, the present invention provides a data communication system that converts and demodulates a first digitized data signal to recover the original data signal and that re-modulates and converts the recovered original data signal to ultimately produce a second digitized data signal. The data communication system implements these functions with a digital signal processor, preferably controlled by a long distance carrier at either a local or remote toll office. Alternatively, the functions can be implemented by a separate bank of modems and converters or by two or more digital signal processors.

In accordance with an alternate embodiment of this invention, instead of implementing the conversion process of this invention at a single location at either the local or remote toll office as described above, the conversion process occurs at both ends of the call and utilizes a data network for internationally transmitting the original computer data. First, the conversion and demodulation of the first digitized data signal to recover the original data signal is implemented by a digital signal processor in an originating country. Then, the original data signal is transmitted over a data network from the originating country to a destination country. Thereafter, the re-modulation and conversion of the original data signal to a second digitized data signal is implemented by a digital signal processor in the destination country, where the second digitized data signal is then processed in a well-known manner.

In accordance with yet other aspects of the present invention, before converting and demodulating the first digitized data signal, the data communication system determines whether such conversion and demodulation needs to occur by identifying the call as a modem or voice call. If a modem call is detected, the data communication system proceeds with the conversion process of the present invention described above. However, if a voice call is detected, the data communication system processes the call in a well-known manner. Alternatively, the data communication system determines whether a special access code has been provided to implement the conversion process of this invention. If the access code has been provided, the data communication system implements the conversion process of this invention as described above. Otherwise, the data communication system processes the call in the conventional fashion.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is directed to a system and method for transmitting data between locations that utilize different digital conversion standards in a way that eliminates conversion distortion and the resulting modem speed penalty. In general, this is accomplished by recognizing that a call is a modem call and then altering the conversion process utilized between the different digital conversion standards.

As will be better understood from the following discussion, altering the digital conversion process of international modem calls is accomplished by a digital signal processor, typically operated by a long distance carrier. First, the long distance carrier receives a first digitized data signal, for example a $\mu$-law digitized data signal, from a computer user in a first country. The long distance carrier identifies whether the incoming signal is a modem call signal. If it is a modem call, the long distance carrier then determines whether the modem call is destined for a country which utilizes a different digital conversion standard than the originating country by analyzing the country code of the number dialed by the computer user. Then, upon determining that the modem call is destined for another country utilizing a different conversion standard, $\mu$-law to A-law for example, the long distance carrier, utilizing the digital signal processor, converts and demodulates the first digitized data signal to recover the original computer data. Then, the digital signal processor re-modulates and converts the original computer data to ultimately produce a second digitized data signal by utilizing a second digital conversion standard used by the destination country. As a result, the distortion created from directly converting the first digitized data signal that is created according to a first digital standard into the second digitized data signal that is created according to a second digital standard is eliminated.

Figure 2:
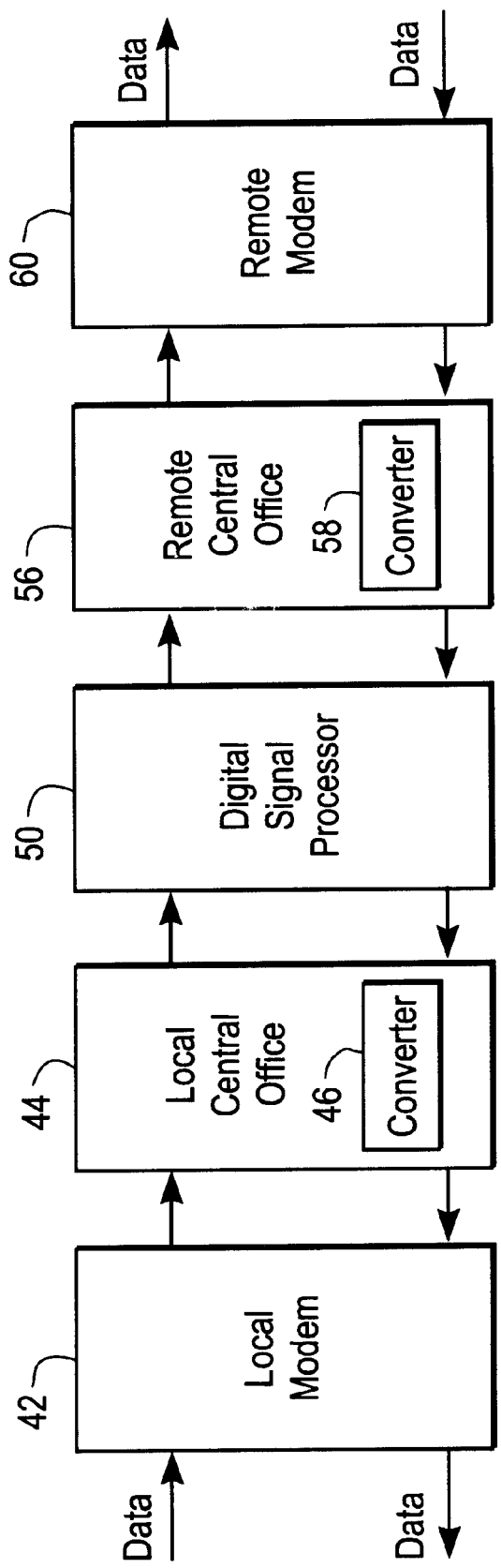
FIG. 2 is a functional block diagram of a data communication system for international modem calls in accordance with the present invention.

FIG. 2 is a functional block diagram illustrating the major components of a data communication system 40 for transmitting international modem calls in accordance with a currently preferred embodiment of the invention. The data communication system 40 includes a first modem 42, a first switch 44, a digital signal processor 50, a second switch 56, and a second modem 60.

The first modem 42 and the first switch 44 are used to encode data for transmission on a digital telephone line according to a first digital conversion standard. The first modem 42, located in a computer of a first user desiring to send the data internationally to a second user, modulates an original data signal to produce a first analog modulated data signal. Then, the first analog modulated data signal is transmitted via an analog telephone link to the first switch 44, which is preferably a local telephone central office. The first switch 44 converts the first analog modulated data signal to a first digitized data signal in accordance with a first digital conversion standard that is selected as the standard in the country in which the first user is located. The first switch 44 preferably includes a converter 46 for making this conversion.

Next, the first digitized data signal is transmitted to the digital signal processor DSP 50. Preferably, the DSP 50 is controlled by a long distance carrier and is located in a local toll office. The DSP 50 operates to identify if the received signal is a modem call, and then it determines whether the modem call, if one has been identified, is destined for another country which utilizes a different digital conversion standard. The DSP 50 determines whether the data signal being transmitted is a modem call by analyzing digitized tones that precede the first digitized data signal. Once the DSP 50 determines that the digitized data signal is indeed a modem call, the DSP 50 disables network echo suppressers. On the other hand, if the DSP 50 were to receive a data signal that is not a modem call, the DSP 50 would handle the call in the conventional fashion.

Then, the DSP 50 determines whether the first digitized data signal is destined for another country by analyzing the country code, area code, and telephone number dialed by the first user of the first modem 42. The DSP 50 also utilizes the country code to determine whether the destination country utilizes a digital conversion standard that is different than the standard used in the country in which the call originated. If the destination country does not utilize a second digital conversion standard, i.e., a different digital conversion standard, the long distance carrier transmits the first digitized data signal to the destination country where the first digitized data signal is converted and demodulated to recover the original data signal in a manner well-known in the art.

On the other hand, if the destination country utilizes a second digital conversion standard, the DSP 50, as will be described in further detail below, converts and demodulates the first digitized data signal to recover the original data signal. Then, the DSP 50 re-modulates and converts the original data signal using the second digital conversion standard to ultimately produce a second digitized data signal.

The second digitized data signal is then transmitted by the long distance carrier over a digital telephone line through a remote toll office to the second switch 56 located in the destination country. The second switch 56, which is preferably a remote telephone central office, converts the second digitized data signal back to the second analog modulated data signal in accordance with the second digital conversion standard utilized by the destination country. The second switch 56 preferably includes a converter 58 for making this conversion. Then, the second switch 56 transmits the second analog modulated data signal to the second modem 60 over an analog telephone line. Finally, the second analog modulated data signal is demodulated by the second modem 60, preferably located in a computer of the second user, to recover the original data signal.

Figure 3:
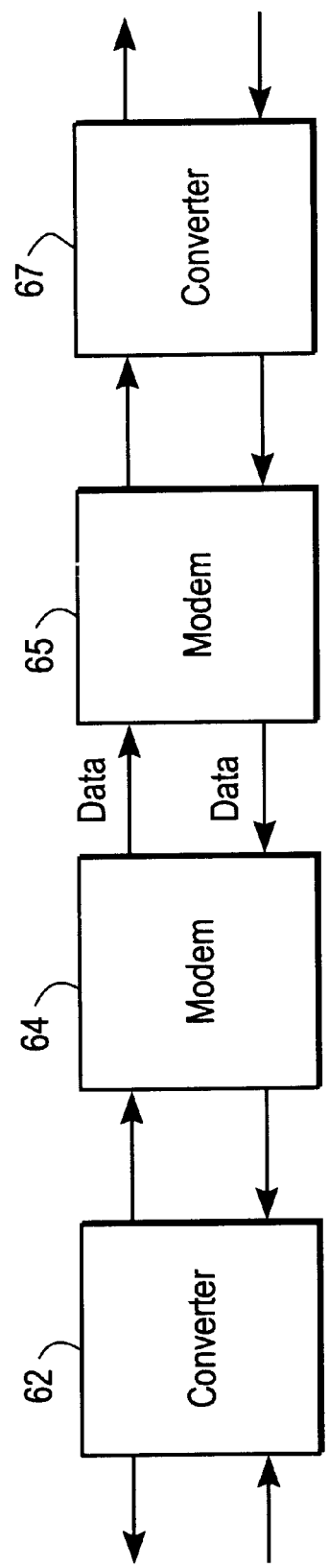
FIG. 3 is a functional block diagram of a digital signal processor of the type depicted in FIG. 2.

FIG. 3 is a functional block diagram that illustrates the major components of the DSP 50 used for converting and demodulating the first digitized data signal and for re-modulating and converting the recovered original data signal to ultimately produce the second digitized data signal. The DSP 50 includes a first DSP converter 62, a first DSP modem 64, a second DSP modem 65, and a second DSP converter 67.

The first DSP converter 62 receives the first digitized data signal from the first switch 44 over a digital telephone line and de-converts the first digitized data signal using the first digital conversion standard to recover the first analog modulated data signal. Then, the first DSP modem 64 demodulates the first analog modulated data signal recovering the original data signal. Next, the original data signal is modulated by the second DSP modem 65 to produce a second analog modulated data signal. Finally, the second analog modulated data signal is converted by the second DSP converter 67, which utilizes the second digital conversion standard, to produce a second digitized data signal.

It will be appreciated by those skilled in the art and others that the functions performed by the single DSP 50 can also be performed by two or more digital signal processors or by utilizing a bank of separate modems and converters. It will also be appreciated by those skilled in the art and others that the DSP 50 may alternatively be located in the remote toll office and, thus, the functions associated with the DSP 50 are carried out at the remote toll office rather than at the local toll office. Even further, the DSP 50 can alternatively be located within and controlled by either the first switch 44 or the second switch 56.

As the world presently utilizes only two digital conversion standards, A-law and $\mu$-law, the first digitized data signal can be an A-law digitized data signal and the second digitized data signal can be a $\mu$-law digitized data signal or vice versa. However, it will be appreciated by those skilled in the art and others that the data communication system 40 can be utilized for eliminating distortion caused by digital conversion between any two incompatible digital conversion standards.

Figure 1:
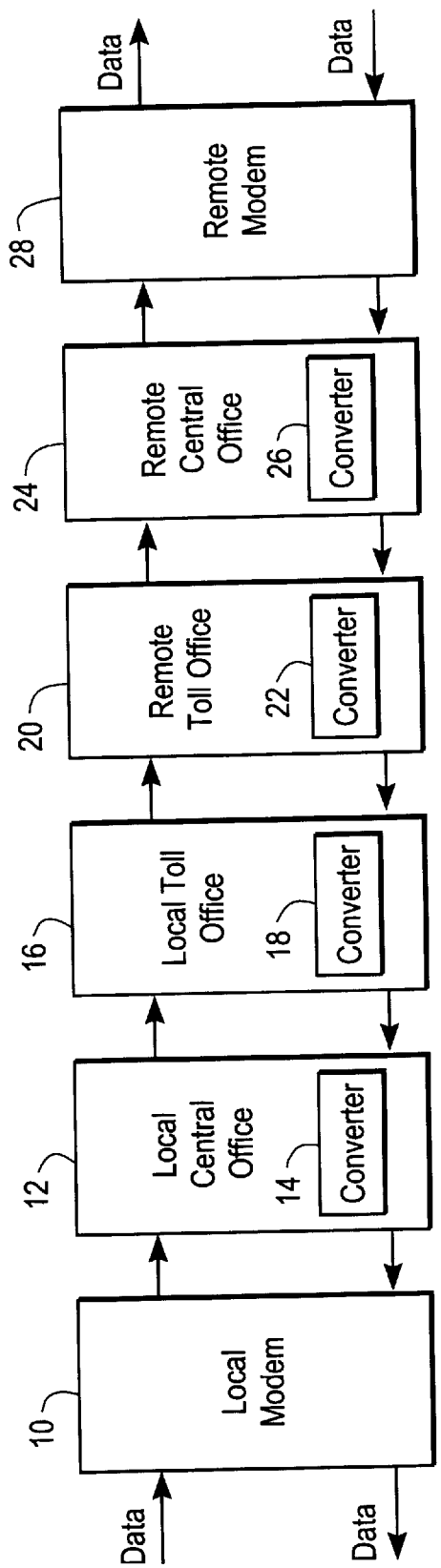
FIG. 1 is a functional block diagram of a prior art data communication system for international modem calls.

Furthermore, as the prior art data communication system depicted in FIG. 1 currently requires that the direct conversion from A-law to $\mu$-law digitized data and vice versa occur within the country that utilizes the $\mu$-law standard, the DSP 50 of the data communication system 40 of this invention is preferably located in the toll office of the country which utilizes the $\mu$-law standard.

In accordance with other aspects of this invention, the long distance carrier may wish to offer two tiers of service, one where a received digitized data signal is directly converted into a second digitized data signal as in the prior art and a second where the conversion implemented by the DSP 50 is used. In this regard, if a computer user desires to send computer data internationally by utilizing the conversion process implemented by the DSP 50 of the present invention, the user dials an access code prior to the country code, area code and phone number. As an example, the long distance company could advertise a second code for modem calls that implement the features of the present invention, but which have a higher per minute rate. If the DSP 50 identifies the special access code, it activates the conversion process implemented by the DSP 50 as described above. Otherwise, it process the call in the conventional fashion.

Figure 4:
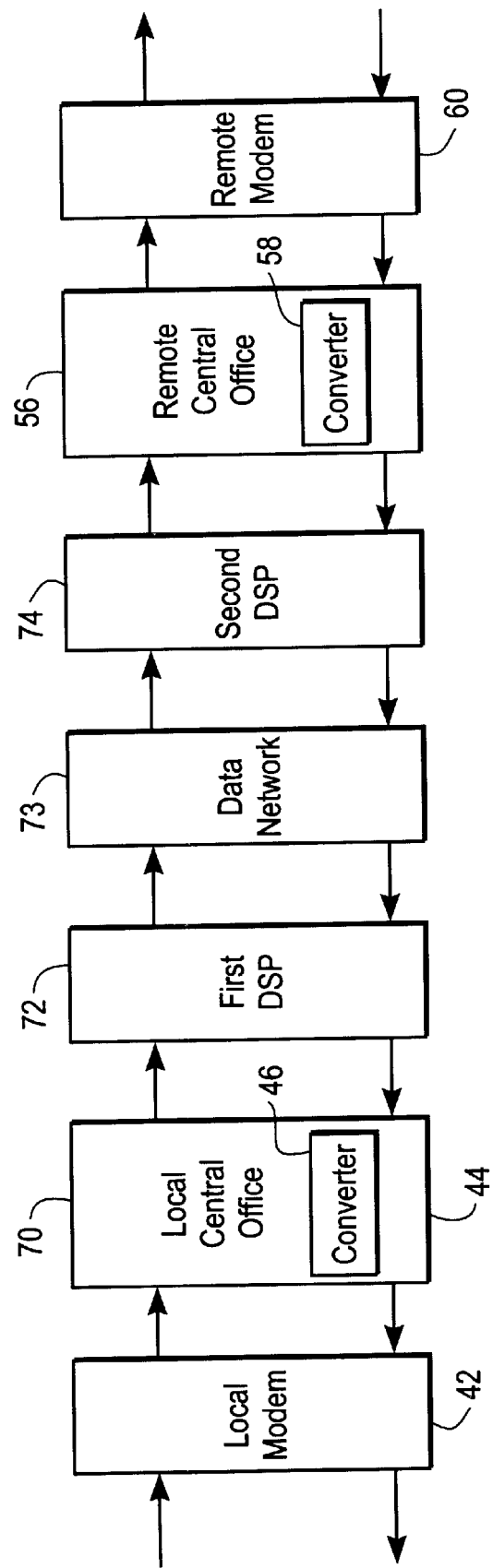
FIG. 4 is a functional block diagram of a data communication system for international modem calls in accordance with alternate aspects of this invention.

FIG. 4 is a functional block diagram illustrating the components of a data communication system 70 for international modem calls in accordance with alternate aspects of this invention. The data communication system 70 is similar to the data communication system 40 depicted in FIG. 2. However, as will be described in further detail, the data communication system 70 performs the functions of converting and demodulating the first digitized data signal to recover the original data signal on one side of the call, i.e. in the originating country, by utilizing a first DSP 72 and performs the functions of re-modulating and re-converting the original data signal into the second digitized data signal on the other end of the call, i.e. in the destination country, by utilizing a second DSP 74. In addition, the original data signal recovered by the first DSP 72 on the first side of the call, i.e. in the first country, is transmitted to the second side, i.e. the second country, via a data network 73.

Preferably, the data network 73 is an Internet service provider which generates Internet protocol packets from the original data signal recovered by the first DSP 72. The Internet service provider transmits the Internet protocol packets to the second country and then regenerates the original data signal from the Internet protocol packets before sending the original data signal to the second DSP 74. As an additional feature, the Internet service provider can also provide error checking, which is typically an inherent feature in most data networks. It will be appreciated by those skilled in the art and others that the data network 73 can be a packet switched network (e.g., IP network, X.25 network, or frame relay network), a circuit switched network, or the like.

Figure 5B:
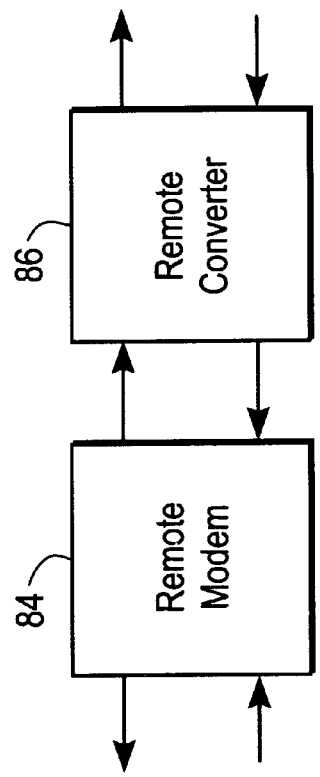
FIG. 5B is a functional block diagram of a second digital signal processor depicted in FIG. 4.
Figure 5A:
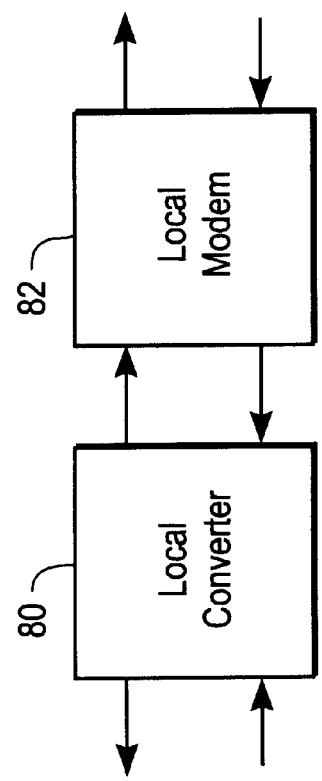
FIG. 5A is a functional block diagram of a first digital signal processor depicted in FIG. 4.

FIG. 5A is a functional block diagram that illustrates the components of the first DSP 72 depicted in FIG. 4. The first DSP 72 includes a converter 80 and a modem 82. The first DSP 72 receives the first digitized data signal, as does the DSP 50 of the data communication system 40 depicted in FIG. 2, and operates to identify whether the call is a modem call and thereafter determines whether the call, if indeed a modem call, is destined for a country which utilizes a different conversion standard. If the call is destined for a country which utilizes a different conversion standard, the converter 80 converts the first digitized data signal back to the first analog modulated data signal. Next, the modem 82 demodulates the recovered first analog modulated data signal to finally recover the original data signal. This original data signal resulting from the modem 82 of the first DSP 72 is then transmitted to the data network 73 and processed by the data network 73 as described above.

It will be appreciated by those skilled in the art and others that the first DSP 72 may be located within a separate computer or within the first switch 44, which is preferably a local central office. Furthermore, the functions performed by the first DSP 72 can alternatively be performed separately by the converter 80 and the modem 82, such that the converter 80 is located at the first switch 44 and the modem 82 is remotely located from the first switch 44. In this regard, the identification of a modem call and determination that a different conversion standard is used by the destination country is performed by the first switch 44.

FIG. 5B is a functional block diagram illustrating the components of the second DSP 74 depicted in FIG. 4. The second DSP 74 includes a modem 84 and a converter 86. The modem 84 receives the original data signal from the data network 73 as described above and modulates the original data signal to produce a second analog modulated data signal. Then, the analog/digital converter 86 converts the second analog modulated data signal into a second digitized data signal. The second digitized data signal is then transmitted to the remote central office 56 and de-converted and demodulated, as in the data communication system 40 depicted in FIG. 2, to produce the original computer data for the end user.

It will also be appreciated by those skilled in the art and others that the second DSP 74 may be located within a separate computer or within the second switch 56, which is preferably a remote central office. Furthermore, the functions performed by the second DSP 74 can alternatively be performed separately by the modem 84 and converter 86, such that the converter 86 is located at the second switch 56 and the modem 84 is remotely located from the second switch.

As will be readily appreciated by those skilled in the art and others, a data communications system in accordance with this invention has a number of advantages. Most importantly, by eliminating the process of converting a first digitized data signal directly into a second digitized data signal which utilizes a different conversion standard, the data communication system of this invention eliminates the distortion and modem speed penalty associated with such a conversion. Thus, the data communication system of this invention can be utilized effectively with high speed modems.

The embodiments of the invention in which an exclusive property or privilege is claimed are defined as follows:

1. A data communication system for reducing conversion distortion between locations that convert analog telephone signals to digital telephone signals according to different digital conversion standards, the data communication system comprising:
   a first telephone switch that receives a telephone call carrying an analog modulated data signal from a modem coupled to a caller's computer, the first switch including a converter that digitally converts the analog modulated data signal to a first digitized data signal according to a first digital conversion standard;
   a processor that receives the first digitized data signal, the processor being programmed to:
      determine whether the telephone call is directed to a location that utilizes a digital conversion standard that is different from the first digital conversion standard, and if so, to:
         (a) convert the first digitized data signal back to the analog modulated data signal;
         (b) demodulate the recovered analog modulated data signal to produce an original data signal;
         (c) modulate the original data signal to produce a second analog modulated data signal;
         (d) convert the second analog modulated data signal to a second digitized data signal according to the other digital conversion standard prior to transmission of the data signal to a receiver of the telephone call.

2. The data communication system of claim 1, wherein the first telephone switch is controlled by a central office of a telephone system that receives analog telephone signals.

3. The data communication system of claim 1, wherein the processor is controlled by a toll office that forwards telephone calls between geographic locations that convert analog signals to digital signals according to different conversion standards.

4. The data communication system of claim 1, wherein prior to converting the first digitized data signal back to the analog modulated data signal, the processor is programmed to determine that the telephone call is a modem call.

5. The data communication system of claim 1, wherein prior to converting the first digitized data signal back to the analog modulated data signal, the processor is programmed to determine that the caller provided a proper access code.

6. The data communication system of claim 1, wherein the first conversion standard is a $\mu$-law conversion standard and the other conversion standard is an A-law conversion standard.

7. The data communication system of claim 1, wherein the first conversion standard is an A-law conversion standard and the other conversion standard is a $\mu$-law conversion standard.

8. A data communication system for reducing conversion distortion between locations that convert analog telephone signals to digital telephone signals according to different digital conversion standards, the data communication system comprising:
   a first telephone switch that receives a telephone call carrying an analog modulated data signal from a modem coupled to a caller's computer, the first switch including a converter that digitally converts the analog modulated data signal to a first digitized data signal according to a first digital conversion standard;
   a first processor that receives the first digitized data signal, the first processor being programmed to:
      determine whether the telephone call is directed to a location that utilizes a digital conversion standard that is different from the first digital conversion standard, and if so, to:
         (a) convert the first digitized data signal back to the analog modulated data signal; and
         (b) demodulate the recovered analog modulated data signal to produce an original data signal;
   a second processor that receives the original data signal, the second processor being programmed to:
      (a) modulate the original data signal to produce a second analog modulated data signal; and
      (b) convert the second analog modulated data signal to a second digitized data signal according to the other digital conversion standard prior to transmission of the data signal to a receiver of the telephone call; and a data network that transmits the original data signal from the first processor to the second processor.

9. The data communication system of claim 8, wherein the data network is an Internet protocol network, the Internet protocol network for:

(a) generating Internet protocol packets from the original data signal after the first processor demodulates the first analog modulated data signal; and (b) re-generating the original data signal from the Internet protocol packets before the second processor modulates the original data signal to produce a second analog modulated data signal.

10. The data communication system of claim 8, wherein the first telephone switch is controlled by a central office of a telephone system that receives analog telephone signals.

11. The data communication system of claim 10, wherein the data network forwards the original data signal between geographic locations that utilize different conversion standards.

12. The data communication system of claim 11, wherein the first processor is controlled by the central office of a telephone system in a location that utilizes the first conversion standard and wherein the second processor is controlled by another central office of a telephone system in the location that utilizes the other conversion standard.

13. The data communication system of claim 8, wherein prior to converting the first digitized data signal back to the analog modulated data signal, the first processor is programmed to determine that the telephone call is a modem call.

14. The data communication system of claim 8, wherein prior to converting the first digitized data signal back to the analog modulated data signal, the processor is programmed to determine that the caller provided a proper access code.

15. A data communication method for reducing conversion distortion between locations that convert analog telephone signals to digital telephone signals according to different digital conversion standards, the method comprising the steps of:

(a) receiving a telephone call carrying a first analog modulated data signal;

(b) converting the first analog modulated data signal to a first digitized data signal according to a first conversion standard;

(c) converting the first digitized data signal back to the first analog modulated data signal;

(d) demodulating the recovered first analog modulated data signal to recover the original data signal;

(e) modulating the original data signal to produce a second analog modulated data signal; and (f) converting the second analog modulated data signal to a second digitized data signal according to a second conversion standard prior to transmitting the data signal to a receiver of the telephone call.

16. The data communication method of claim 15, wherein steps (c) through (f) are performed upon determining that the telephone call is a modem call.

17. The data communication method of claim 16, wherein steps (c) through (f) are performed upon also determining that the telephone call is destined for a location that utilizes a different conversion standard than the call's originating location.

18. The data communication method of claim 15, wherein steps (c) through (f) are performed upon receiving an access code.

19. The data communication method of claim 15, wherein prior to modulating the original data signal to produce a second analog modulated data signal, the method further includes transmitting the recovered original data signal over a data network.

20. The data communication method of claim 19, wherein the step of transmitting the recovered original data signal over a data network further comprises:

generating data protocol packages from the original data signal for transmission over the data network; and re-generating the original data signals from the data protocol packets.

21. The data communication method of claim 20, wherein the protocol used is Internet protocol.

22. The data communication method of claim 21, wherein the data network is the Internet.

* * * * *